(12) United States Patent
Wagner et al.

(10) Patent No.: US 7,657,922 B2
(45) Date of Patent: Feb. 2, 2010

(54) DYNAMIC DIGITAL RECORDING

(75) Inventors: Mark Wagner, Seattle, WA (US);
Kenneth Mak, Redmond, WA (US);
Tim C Nichols, Los Altos, CA (US);
Keith W Clanton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 11/152,939

(22) Filed: Jun. 15, 2005

(65) Prior Publication Data

US 2006/0285834 A1 Dec. 21, 2006

(51) Int. Cl.
*G06F 3/00* (2006.01)
*G06F 13/00* (2006.01)
*H04N 5/445* (2006.01)
*H04N 9/79* (2006.01)
*H04N 5/91* (2006.01)
*H04N 7/00* (2006.01)
*H04N 7/26* (2006.01)
*H04N 5/00* (2006.01)

(52) U.S. Cl. .......................... 725/153; 725/58; 386/45; 386/46; 386/124; 386/125; 386/126

(58) Field of Classification Search .................. 725/58, 725/133, 134, 141, 142, 153; 386/45, 46, 386/105, 106, 124–126
See application file for complete search history.

(56) References Cited

U.S. PATENT DOCUMENTS

| | | | |
|---|---|---|---|
| 6,678,462 B1 * | 1/2004 | Chihara | 386/83 |
| 7,391,957 B2 * | 6/2008 | Behl | 386/46 |
| 2002/0073424 A1 * | 6/2002 | Ward et al. | 725/42 |
| 2003/0154484 A1 * | 8/2003 | Plourde et al. | 725/58 |
| 2003/0172317 A1 * | 9/2003 | Tsunoda et al. | 714/7 |
| 2005/0278774 A1 * | 12/2005 | Eshleman et al. | 725/153 |
| 2007/0226766 A1 * | 9/2007 | Poslinski et al. | 725/89 |
| 2008/0034391 A1 * | 2/2008 | Lehman et al. | 725/59 |

* cited by examiner

Primary Examiner—Dominic D Saltarelli
(74) Attorney, Agent, or Firm—Lee & Hayes, PLLC (57) ABSTRACT

Dynamic digital recording is described. A client device is configured to include digital recording capabilities. The digital recording capabilities are automatically enabled when recording media is connected to the client device, and the digital recording capabilities are automatically disabled when the recording media is not connected to the client device.

17 Claims, 7 Drawing Sheets

Figure 7

DYNAMIC DIGITAL RECORDING

BACKGROUND

An increasing variety of television set-top boxes (STB's) with digital video recording (DVR) capability is becoming available. However, the addition of DVR capability to a STB can add significant cost and complexity in the form of large hard-disk drives and associated electronics. The increased bill of materials cost poses significant challenges to media service providers such as cable and satellite television companies. If a media service provider absorbs the increased cost required to include DVR capability in the STB's, then the time to break-even for each subscriber is increased. Alternatively, the media service provider may increase the up front cost to a subscriber for a STB with DVR capability. This may be frustrating, or even cost prohibitive, to a user, who may not want DVR functionality, but may want other functionality (such as support for high definition television) that a particular STB provides. Furthermore, users may be frustrated by the need to obtain a new STB if they choose to add a DVR package to an existing subscription.

SUMMARY

Dynamic digital recording is described. A television set-top box is configured such that a removable external hard disk drive may be connected to or disconnected from the set-top box at any time. When the external hard disk drive is connected to the set-top box, digital recording capabilities (e.g., the ability to record a program and/or the ability to control the playback of broadcast television via pause, advance, or reverse commands, such as play, fast-forward, skip forward, rewind, or skip reverse) are automatically enabled. When the external hard disk drive is disconnected from the client device, the digital recording capabilities are automatically disabled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of dynamic digital recording provide techniques for dynamically modifying data flow through a digital media system based on whether or not removable digital recording media (e.g., an external hard disk drive) is connected to the digital media system. A digital media system may include a digital recording subsystem that may be automatically enabled when a hard disk drive is connected to the system, and automatically disabled when a hard disk drive is removed from the system.

When the digital media system is initially powered on, a disk manager checks for the presence of an externally connected recording media. If no disk is detected, normal tuning and presentation of broadcast media content is enabled, but without any digital recording capability. The disk manager continually monitors any external device ports to detect when external recording media is connected to the digital media system. If the disk manager detects the connection of an external recording media, then data flow through the digital media system is automatically modified to enable digital recording capabilities.

The following discussion is directed to dynamic digital recording. While features of dynamic digital recording can be implemented in any number of different computing environments, they are described in the context of the following exemplary implementations.

Figure 1:
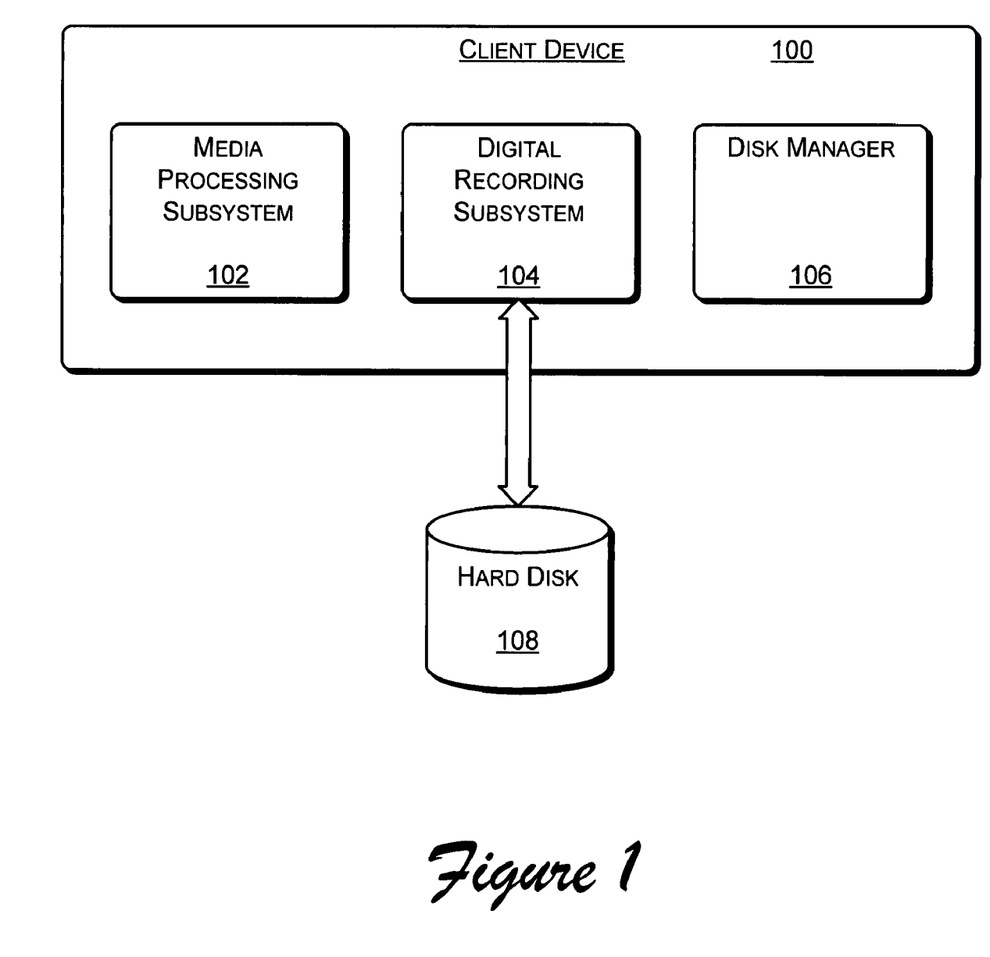
FIG. 1 illustrates selected components of an exemplary client device configured to implement dynamic data recording.

FIG. 1 illustrates selected components an exemplary client device 100 configured to implement dynamic data recording. Client device 100 includes, in part, media processing subsystem 102, digital recording subsystem 104, and disk manager 106. Client device 100 is implemented to receive media content from one or more media content providers, for example, via a network such as a cable television network, a satellite television network, or the Internet. Media processing subsystem 102 includes hardware and/or software that enables client device 100 to process the received media content such that the media content can be presented, for example, via a display device. Digital recording subsystem 104 includes hardware and/or software that enables client device 100 to record media content that is received and provide other digital recording based functionality, such as pause and/or rewind of real-time broadcast media content. Disk manager 106 is configured to detect the connection and/or disconnection of external recording devices (e.g., external hard disk 108), and automatically enable or disable digital recording subsystem 104 accordingly. For example, when a user connects hard disk 108 to client device 100, disk manager 106 automatically enables digital recording subsystem 104. Similarly, when a user disconnects hard disk 108 from client device 100, disk manager 106 automatically disables digital recording subsystem 104.

Figure 2:
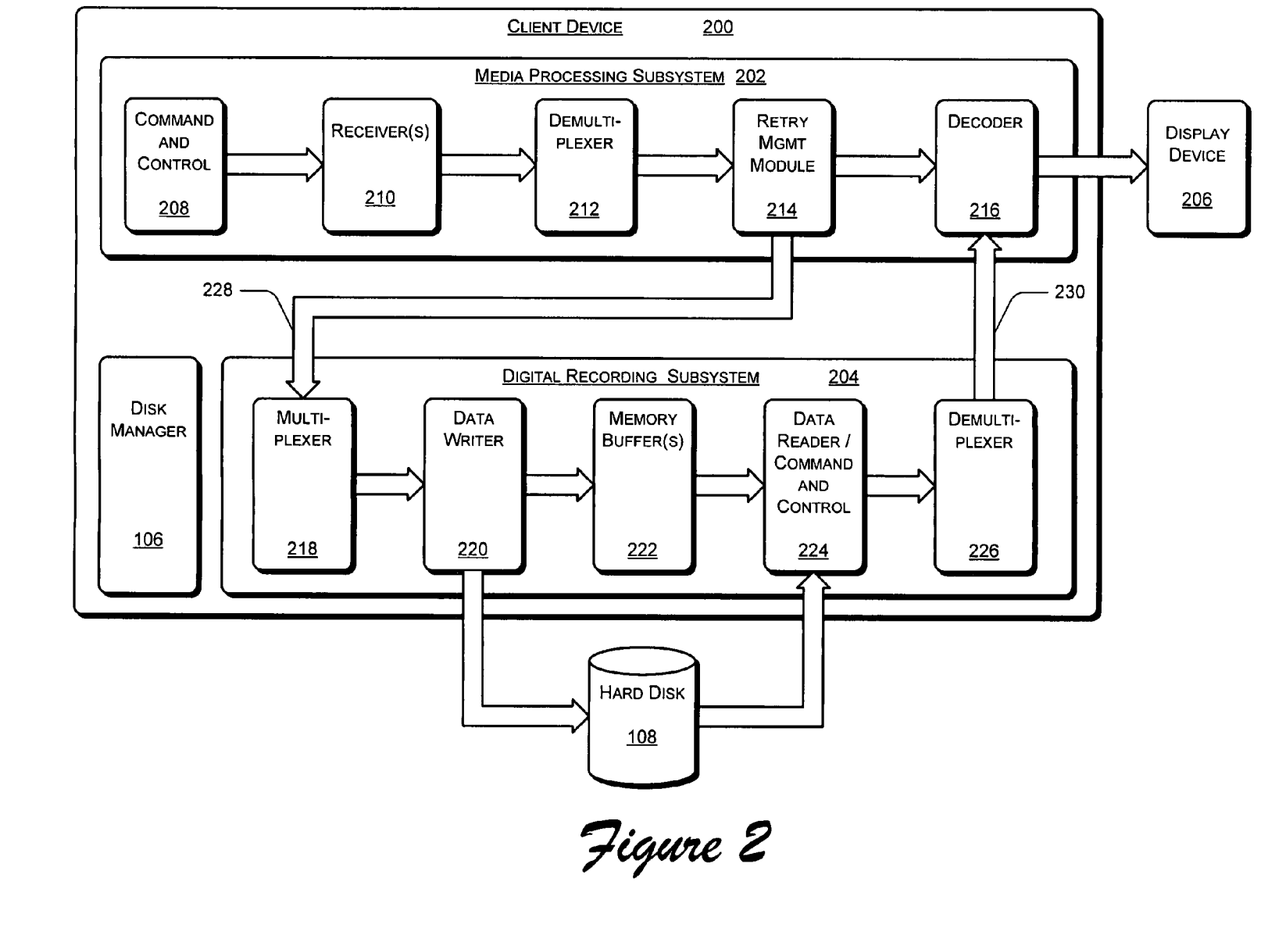
FIG. 2 illustrates an exemplary dynamic data flow through selected components of a client device configured to implement dynamic data recording.

FIG. 2 illustrates an exemplary dynamic data flow through selected components of client device 200. Client device 200 includes, in part, media processing subsystem 202, digital recording subsystem 204, and disk manager 106. Media processing subsystem 202 includes hardware and/or software that enables client device 200 to receive media content and process the media content such that the media content can be presented via display device 206. Digital recording subsystem 204 includes hardware and/or software that enables client device 200 to record media content that is received and provide other digital recording based functionality, such as pause and/or rewind of live broadcast media content. Disk manager 106 is configured to detect the connection and/or disconnection of external recording devices (e.g., external hard disk 108), and automatically enable or disable digital recording subsystem 204 accordingly.

Media processing subsystem 202 includes command and control module 208, receiver(s) 210, de-multiplexer 212, retry management module 214, and decoder 216. Command and control module 208 receives control commands, such as channel change commands, and directs receiver(s) 210 to tune to, or otherwise access, a broadcast channel or service from which media content may be received. Receiver(s) 210 is representative of one or more unicast and or multicast receivers configured to receive audio and/or video data signals from any type of data source, including, but not limited to over a satellite network, a broadcast network, a local area network, a wide area network, the Internet, a wired network, or a wireless network. De-multiplexer 212 processes the received data signals to generate separate audio and video streams. Retry management module 214 examines the received audio and video data, identifies missing data packets, and requests that a data server resend the missing data packets. Decoder 216 formats the distinct audio and video streams and transmits the audio and video streams to display device 206.

Digital recording subsystem 204 includes multiplexer 218, data writer 220, memory buffer(s) 222, data reader/command and control module 224, and de-multiplexer 226. Multiplexer 218 combines separate audio and video streams into a single data stream. Data writer 220 writes data packets from the single data stream generated by multiplexer 218 to memory buffer(s) 222 and/or to hard disk 108, which is housed, for example, in an external hard disk drive. Data reader/command and control module 224 retrieves data from memory buffer(s) 222 and/or hard disk 108. Data reader/command and control module 224 may also receive and process control commands. For example, data reader/command and control module 224 may receive a pause command, an advance command (e.g., play, skip forward, or fast-forward), or reverse command (e.g., skip reverse or rewind) from a user via a remote control device. In response to the received commands, data reader/command and control module 224 reads the appropriate data from memory buffer(s) 222 and/or hard disk 108. De-multiplexer 226 processes a data stream received from data reader/command and control module 224 to generate separate audio and video streams.

As described above, disk manager 106 is configured to detect the connection and/or removal of external recording devices (e.g., hard disk 108), and automatically enable or disable digital recording subsystem 204 accordingly. For example, when no external hard disk drive is connected to client device 200, data flows through the components of media processing subsystem 202 as shown in FIG. 2, bypassing digital recording subsystem 204. However, when disk manager 106 detects that an external hard disk drive has been connected to client device 200, disk manager 106 automatically modifies the data flow such that instead of flowing directly from retry management module 214 to decoder 216, data flows from retry management module 214 to digital recording subsystem 204, as indicated by arrow 228, and then back to decoder 216, as indicated by arrow 230. Similarly, when disk manager 106 detects that an external hard disk drive is disconnected from client device 200, leaving no other connected external hard disk drive, disk manager 106 automatically modifies the data flow to bypass digital recording subsystem 204.

Figure 3:
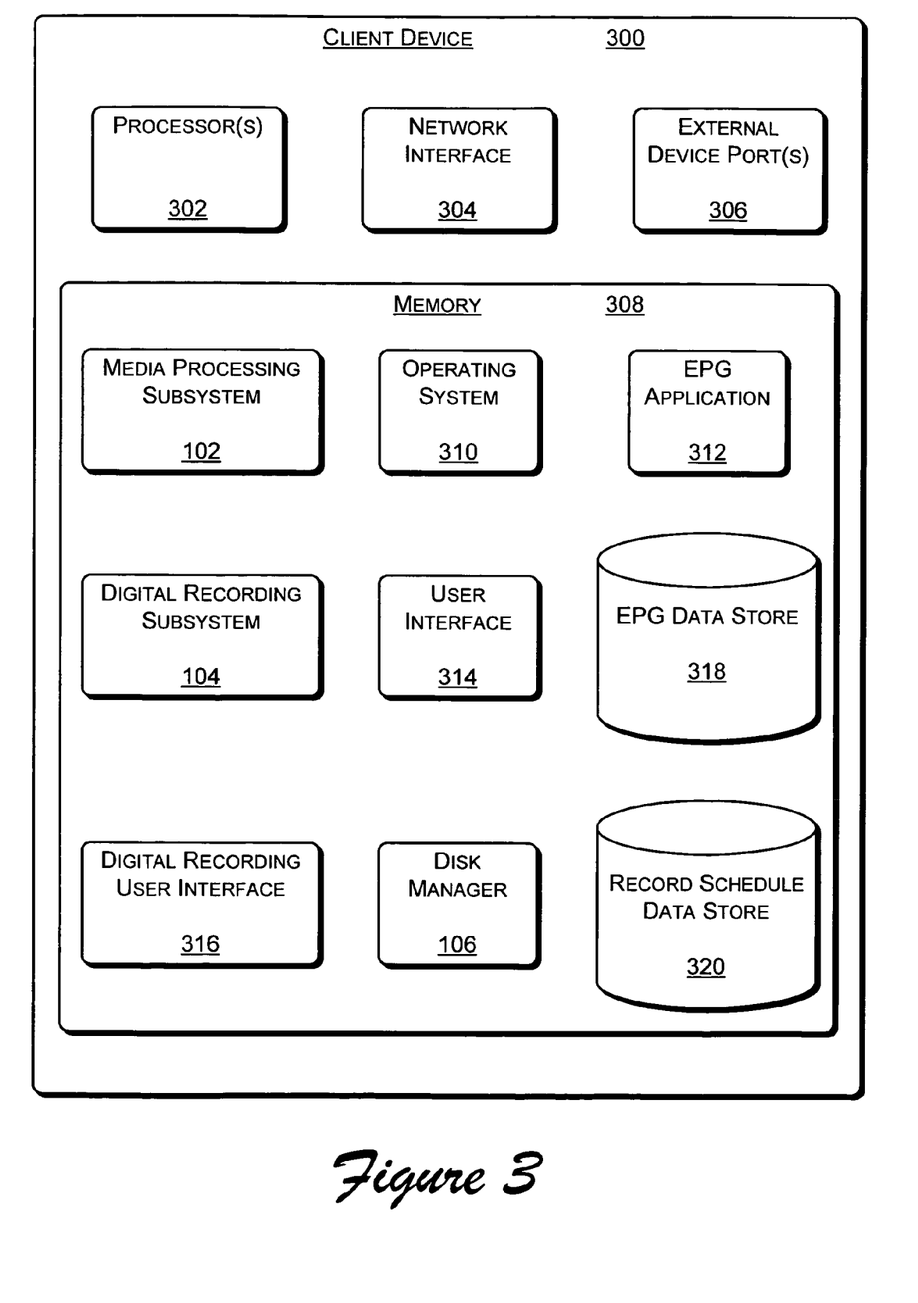
FIG. 3 illustrates selected components of an exemplary client device configured to implement dynamic data recording.

FIG. 3 illustrates selected components of an exemplary client device 300 configured to implement dynamic data recording. Client device 300 includes one or more processors 302, network interface 304, one or more external device ports 306, and memory 308. Network interface 304 enables client device to receive media content such as broadcast television programs, on-demand movies, music, and so on, over a network. External device port(s) 306 provide a means by which external recording media (e.g., external hard disk 108) may be connected to client device 300. External device port(s) 306 may be implemented in any number of ways, including, but not limited to, as a universal serial bus (USB) port, a firewire port, or an Ethernet connection. As one example, client device 300 may be connected to a computing system with storage capabilities via a network connection (e.g., an Ethernet connection). In this example, the client device accesses a hard disk or other storage media associated with the computing system as network attached storage.

Operating system 310, electronic program guide (EPG) application 312, user interface 314, media processing subsystem 102, digital recording subsystem 104, disk manager 106, and digital recording user interface 316 are stored in memory 308 and executed on processor(s) 302. EPG application 312 provides access to data that identifies programs that are scheduled for broadcast. EPG data may be received by client device over a network and stored, for example, in EPG data store 318. User interface 314 enables user interaction with client device 300, for example, via on-screen menus and prompts. Media processing subsystem 102 enables client device 300 to receive media content and process the media content such that the media content can be presented, for example, via a display device. Selected components of an exemplary media processing subsystem are described in further detail above with reference to FIG. 2.

Digital recording subsystem 104 enables digital recording of media content via client device 300. Media content may be recorded if an external recording device (e.g., an external hard disk drive) is connected to client device 300, for example, via an external device port 306. Disk manager 106 determines whether or not an external recording device is connected, and enables or disables digital recording subsystem 104, accordingly. For example, if an external hard disk drive is connected to client device 300, then disk manager 106 automatically enables digital recording subsystem 104. Similarly, when an external hard disk drive is disconnected from client device 300, disk manager 106 automatically disables digital recording subsystem 104.

Digital recording user interface 316 provides a user interface via which a user may interact with digital recording subsystem 104, for example, to schedule programs to be recorded. Record schedule data store 320 maintains recording schedule data that identifies, for example, which programs are scheduled to be recorded. In an exemplary implementation, digital recording user interface 316 may be disabled when digital recording subsystem 104 is disabled. Alternatively, digital recording user interface 316 may remain enabled so that users can schedule programs to be recorded at a later time, even if, at the present time, there is no external recording media connected to client device 300.

Methods for dynamic data recording may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
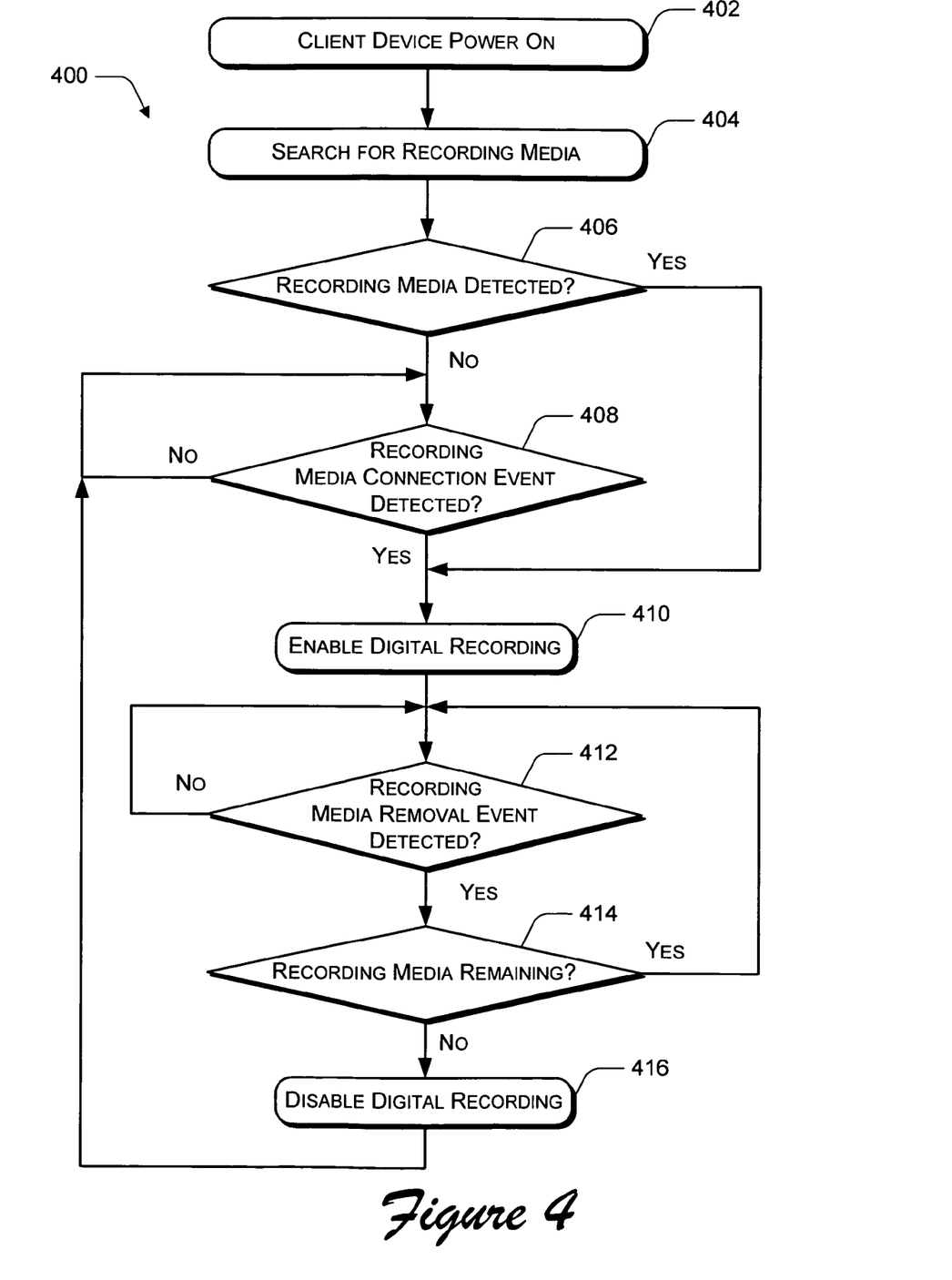
FIG. 4 illustrates an exemplary method for dynamically enabling and disabling digital recording.
Figure 5:
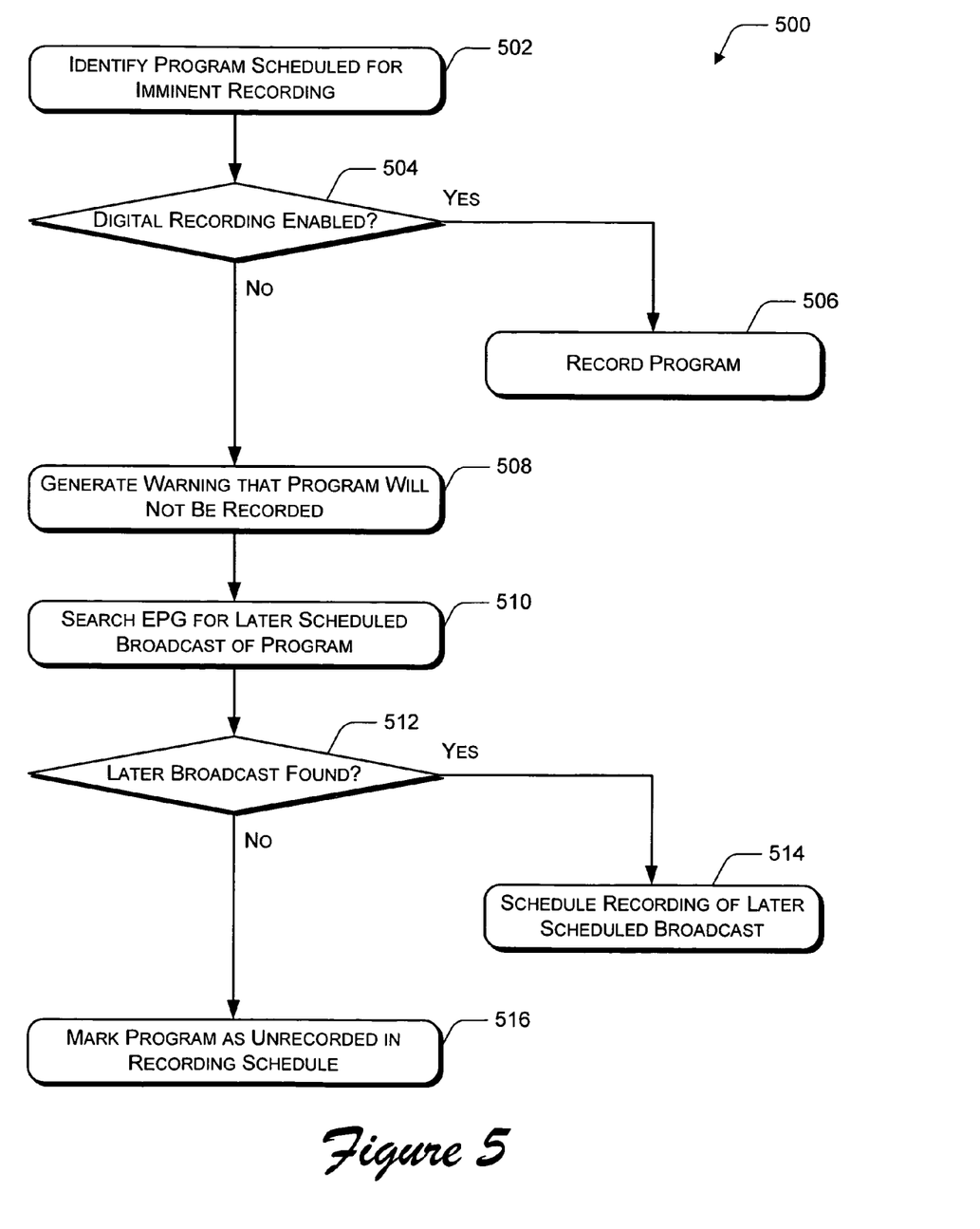
FIG. 5 illustrates an exemplary method for managing a recording schedule that may be serviced by a dynamic digital recording system.
Figure 6:
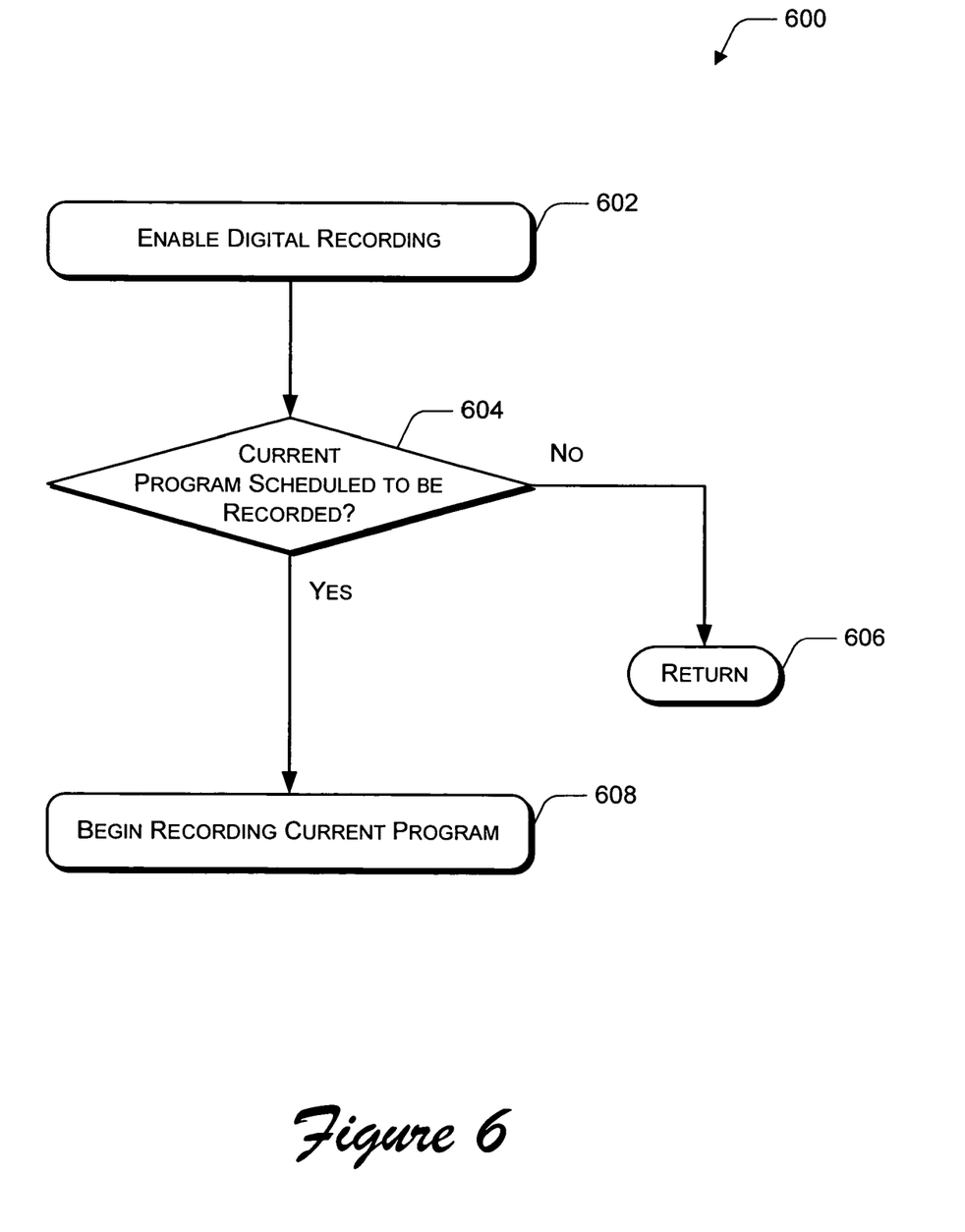
FIG. 6 illustrates an exemplary method for recording media content based on dynamic enablement of digital recording.

FIGS. 4-6 illustrate exemplary methods for implementing dynamic data recording. FIGS. 4-6 are specific examples of dynamic data recording, and are not to be construed as limitations. Furthermore, it is recognized that various embodiments may implement any combination of the methods illustrated in FIGS. 4-6 or any combination of portions of the methods illustrated in FIGS. 4-6.

FIG. 4 illustrates an exemplary method 400 for dynamically enabling and disabling digital recording. The order in which the method is described is not intended to be construed as a limitation, and any number of the described method blocks can be combined in any order to implement the method. Furthermore, the method can be implemented in any suitable hardware, software, firmware, or combination thereof.

At block 402, a client device is powered on. At block 404, a search for connected recording media is performed. For example, disk manager 106 determines whether or not any external recording devices are connected to external device ports 306.

At block 406, it is determined whether or not a connected recording media was detected. If a connected recording media is detected (the "Yes" branch from block 406), then processing continues as described below with reference to block 410.

On the other hand, if no connected recording media is detected (the "No" branch from block 406), then at block 408, it is determined whether or not a recording media connection event has been detected. For example, disk manager 106 monitors external device ports 306 to detect when an external recording device is connected. As indicated by the "No" branch from block 408, no further processing is performed until a recording media connection event is detected.

When a recording media connection event is detected (the "Yes" branch from block 408), at block 410, digital recording capabilities are enabled. For example, when disk manager 106 determines that an external recording device has been connected via an external device port 306, disk manager 106 automatically modifies data flow through client device 300 to include digital recording subsystem 104.

At block 412, it is determined whether or not a recording media removal event has been detected. For example, disk manager 106 monitors external device ports 306 to detect when an external recording device is disconnected. As indicated by the "No" branch from block 412, no further processing is performed until a recording media removal event is detected.

When a recording media removal event is detected (the "Yes" branch from block 412), at block 414, it is determined whether or not any recording media remain connected. For example, if client device 300 includes multiple external device ports 306, disk manager 106 examines the multiple external device ports to determine whether or not any external recording devices remain connected to client device 300. If it is determined that at least one recording media remains connected (the "Yes" branch from block 414), then processing continues as described above with reference to block 412.

When it is determined that no recording media remain connected (the "No" branch from block 414), at block 416 digital recording capabilities are disabled. For example, disk manager 106 automatically modifies data flow through client device 300 to bypass digital recording subsystem 104.

FIG. 5 illustrates an exemplary method 500 for managing a recording schedule that may be serviced by a dynamic digital recording system. The order in which the method is described is not intended to be construed as a limitation, and any number of the described method blocks can be combined in any order to implement the method. Furthermore, the method can be implemented in any suitable hardware, software, firmware, or combination thereof.

At block 502, a program scheduled for imminent recording is identified. For example, an alert is generated based on data stored in record schedule data store 320.

At block 504, it is determined whether or not digital recording is currently enabled. For example, disk manager 106 indicates whether or not digital recording subsystem 104 is currently being bypassed.

If it is determined that digital recording is enabled (the "Yes" branch from block 504), then at block 506, the program is recorded.

On the other hand, if it is determined that digital recording is not currently enabled (the "No" branch from block 504), then at block 508, a warning that the program will not be recorded is generated. For example, digital recording user interface 316 presents an on-screen warning so that a user may choose to connect an external recording device.

At block 510, an electronic program guide (EPG) is searched in an attempt to locate a later scheduled broadcast of the program. For example, EPG data store 318 is queried based on a program name.

At block 512 it is determined whether or not a later scheduled broadcast of the program was located. If a later scheduled broadcast of the program was located (the "Yes" branch from block 512), then at block 514, the later scheduled broadcast of the program is scheduled to be recorded. For example, data in record schedule data store 320 is modified (or new data is added) to indicate the new record time associated with the program.

On the other hand, if a later scheduled broadcast of the program was not located (the "No" branch from block 512), then at block 516, the program is marked as unrecorded in a recording schedule. For example, a "not recorded" flag is added to data associated with the program in record schedule data store 320.

FIG. 6 illustrates an exemplary method 600 for recording media content based on dynamic enablement of digital recording. The order in which the method is described is not intended to be construed as a limitation, and any number of the described method blocks can be combined in any order to implement the method. Furthermore, the method can be implemented in any suitable hardware, software, firmware, or combination thereof.

At block 602, digital recording is dynamically enabled. For example, as described above with reference to block 410 of FIG. 4, disk manager 106 automatically modifies data flow through client device 300 to include digital recording subsystem 104.

At block 604, it is determined whether or not a currently available program is scheduled to be recorded. For example, data stored in EPG data store 318 is compared with data stored in record schedule data store 320 to determine whether any programs currently being broadcast were scheduled to be recorded.

If it is determined that there are not currently available programs scheduled to be recorded (the "No" branch from block 604), then processing terminates, as indicated by block 606. On the other hand, if it is determined that a currently available program is scheduled to be recorded (the "Yes" branch from block 604), then at block 608, recording of the program is initiated. For example, when digital recording subsystem 104 is enabled, the data stream(s) associated with the identified program are written to an external recording media connected to client device 300 via external device port 306.

Figure 7:
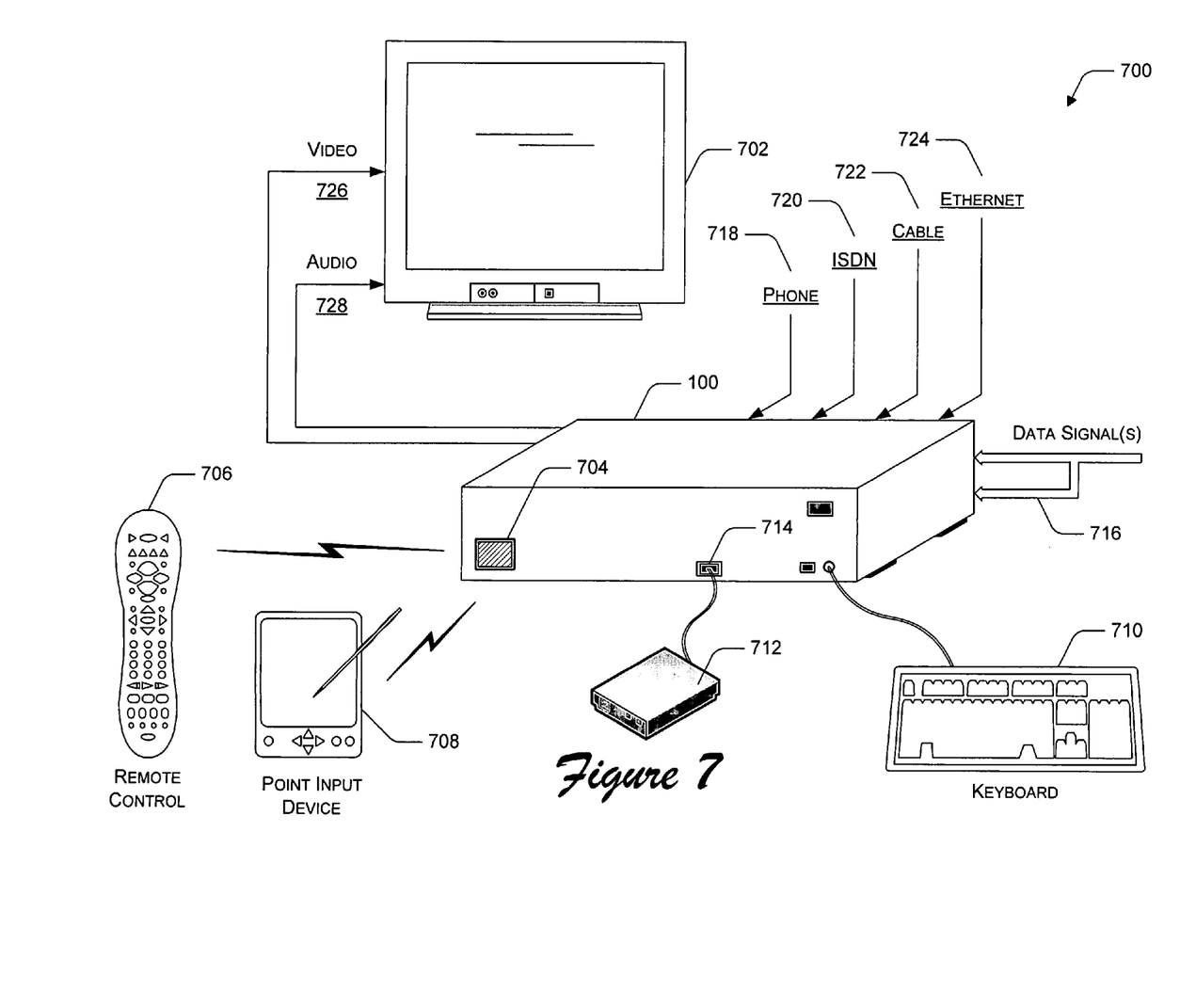
FIG. 7 illustrates an exemplary environment in which dynamic digital recording may be implemented.

FIG. 7 illustrates an exemplary digital media system 700 in which dynamic digital recording may be implemented. Exemplary client device 100 is shown as a standalone unit that connects to a display device 702 (e.g., a television). Client device 100 can be implemented in any number of embodiments, including as a set-top box, a satellite receiver, a game console, an information appliance, and so on. Client device 100 includes a wireless receiving port 704, such as an infrared (IR) or Bluetooth wireless port, for receiving wireless communications from a remote control device 706, a handheld input device 708, or any other wireless device, such as a wireless keyboard. Handheld input device 708 can be a personal digital assistant (PDA), handheld computer, wireless phone, or the like. Additionally, a wired keyboard 710 may be coupled to communicate with the client device 100. In alternate embodiments, remote control device 706, handheld device 708, and/or keyboard 710 may use an RF communication link or other mode of transmission to communicate with client device 100.

An external hard disk drive 712 may be connected to client device 100 via an external device port such as universal serial bus (USB) port 714. Client device 100 may include multiple external device ports enabling the simultaneous connection of multiple external devices via which media content may be recorded. In an exemplary implementation, client device 100 is configured such that the external device ports enable connection and removal of external devices without requiring that the client device be powered off. For example, while client device 100 is powered on, external hard disk drive 714 may be connected to client device 100 via USB port 714, automatically enabling digital recording, without requiring that the client device be rebooted.

Client device 100 receives media content in the form of data signals 716 from one or more media sources, such as from a satellite, the Internet, or a broadcast media network. Client device 100 includes hardware and/or software for receiving and decoding data signals 716, such as an NTSC, PAL, SECAM or other media system data signal. Furthermore, client device 100 includes hardware and/or software for digital recording of received media content, which can be dynamically enabled and/or disabled based on whether or not recording media (e.g., external hard disk drive 712) is connected to client device 100. Client device 100 also includes hardware and/or software for providing the user with a graphical user interface by which the user can, for example, access various network services, configure the client device 100, schedule media content to be recorded, and perform other functions.

Client device 100 is capable of communicating with other devices via one or more connections including a conventional telephone link 718, an ISDN link 720, a cable link 722, and an Ethernet link 724. Client device 100 may use any one or more of the various communication links 718-724 at a particular instant to communicate with any number of other devices.

Client device 100 generates video signal(s) 726 and audio signal(s) 728, both of which are communicated to display device 702. The video signals and audio signals can be communicated from client device 100 to display device 702 via an RF (radio frequency) link, S-video link, composite video link, component video link, or other communication link. Although not shown in FIG. 7, client device 100 may include one or more lights or other indicators identifying the current status of the device. Additionally, the client device may include one or more control buttons, switches, or other selectable controls for controlling operation of the device.

Although embodiments of dynamic data recording have been described in language specific to structural features and/or methods, it is to be understood that the subject of the appended claims is not necessarily limited to the specific features or methods described. Rather, the specific features and methods are disclosed as exemplary implementations of dynamic data recording.

The invention claimed is:

1. A media entertainment system comprising:
   a plurality of external device ports via which one or more digital recording media may be connected to the media entertainment system;
   a media processing subsystem configured to provide media data flow through the media processing subsystem in an event that no external digital recording media is currently connected to the media entertainment system, and prepare media content for presentation;
   a digital recording subsystem configured to provide media data flow through the digital recording subsystem in an event that one or more digital recording media is currently connected to the media entertainment system, and provide digital recording capabilities;
   a digital recording user interface configured to schedule a program to be recorded even if there is currently no external recording media connected to the media entertainment system; and
   a disk manager configured to automatically enable the digital recording subsystem in an event that one or more digital recording media is connected to the media entertainment system, and automatically disable at least a portion of the digital recording subsystem in an event that no digital recording media is connected to the media entertainment system,
   wherein:
   the one or more digital recording media are external to the media entertainment system;
   the media processing subsystem and the digital recording subsystem are physically distinct from each other;
   the media processing subsystem and the digital recording subsystem are located at the media entertainment system; and
   the digital recording system comprises a memory buffer.

2. The system as recited in claim 1, wherein the disk manager is further configured to:
   monitor the external device port to detect connection or disconnection of the digital recording media;
   automatically enable the digital recording subsystem in an event that connection of the digital recording media is detected; and
   automatically disable the digital recording subsystem in an event that disconnection of the digital recording media is detected.

3. The system as recited in claim 1, wherein the digital recording capabilities comprise at least one of a record capability, a real-time pause capability, or a real-time rewind capability.

4. The system as recited in claim 1, wherein at least one external device port comprises an Ethernet port such that a digital recording media associated with another system may be connected to the media entertainment system via a network connection.

5. The system as recited in claim 1, wherein at least one digital recording media comprises an external hard disk.

6. The system as recited in claim 1, wherein the media processing subsystem comprises:
   a command and control module configured to receive control commands from a user;
   a receiver configured to receive digital media content via a network; and a decoder configured to format the received digital media content for presentation.

7. The system as recited in claim 1, wherein the digital recording subsystem comprises:
   a memory buffer;
   a data writer configured to write media content to at least one of the memory buffer or the digital recording media; and
   a command and control module configured to receive control commands from a user.

8. The system as recited in claim 7, wherein the control commands comprise at least one of a record command, a pause command, an advance command, or a reverse command.

9. A method comprising:
   receiving, by a digital media system, media data from a source;
   directing a data flow path through a media processing subsystem of the digital media system to display the media data;
   if receiving an event notification that indicates an external digital recording device has been connected to the digital media system,
      re-directing the data flow path through a digital recording subsystem of the digital media system to display the media data; and
   automatically enabling a digital recording subsystem configured to write digital media content to the external digital recording device,
   wherein:
   the external digital recording device is external to the digital media system;
   the media processing subsystem and the digital recording subsystem are physically distinct from each other; and
   the media processing subsystem and the digital recording subsystem are located at the digital media system.

10. The method as recited in claim 9, wherein the receiving an event notification comprises determining that the external digital recording device is connected to the digital media system when the digital media system is powered on.

11. The method as recited in claim 9, wherein the receiving an event notification comprises detecting that the external digital recording device has been connected to the digital media system while the digital media system is powered on.

12. The method as recited in claim 9, further comprising:
   receiving an additional event notification that indicates the external digital recording media has been disconnected from the digital media system;
   determining that there is not another external digital recording media connected to the system; and
   automatically disabling at least a portion of the digital recording subsystem.

13. The method as recited in claim 12, wherein the receiving an additional event notification comprises detecting that the external digital recording device has been disconnected from the digital media system while the digital media system is powered on.

14. The method as recited in claim 9, wherein automatically disabling the digital recording subsystem comprises modifying a data flow path within the digital media system to direct data to bypass the digital recording subsystem.

15. One or more computer-readable media comprising computer-readable instructions which, when executed, cause a digital media system to perform a method, the method comprising:
   receiving media data from a source;
   directing a data flow path through a media processing subsystem of the digital media system to display the media data;
   identifying a program that is scheduled for imminent recording; and
   determining whether an external recording media is currently connected to the digital media system,
      in an event that the external recording media is currently connected to the digital media system,
         enabling digital recording;
         re-directing the data flow path through a digital recording subsystem of the digital media system to display the program, the media processing subsystem and the digital recording subsystem being physically distinct from each other; and
         recording the program;
      in an event that the external recording media is not currently connected to the digital media system,
         presenting a user warning at a display device, the user warning comprising a warning that the scheduled program will not be recorded unless digital recording media is timely connected to the digital media system;
         automatically searching an electronic program guide data to determine whether a later scheduled broadcast of the program exists,
            in an event that a later scheduled broadcast of the program is not located, marking the program as unrecorded in a recording schedule;
            in an event that a later scheduled broadcast of the program is located,
               indicating a new record time associated with the program in the recording schedule; and
               automatically scheduling the later scheduled broadcast of the program to be recorded so that, if the external recording media is connected to the digital media system when the later schedule broadcast of the program begins, the program will be recorded.

16. The one or more computer-readable media as recited in claim 15, the method further comprising causing, upon completion of a broadcast of the program, modifying the recording schedule for the program to indicate that the program was not successfully recorded.

17. The one or more computer-readable media as recited in claim 15, the method further comprising:
   determining that the digital recording capabilities have been automatically enabled;
   determining that at least a portion of a program that was scheduled to be recorded is currently available, but is not currently being recorded; and
   automatically beginning recording the portion of the program.

* * * * *